US012595067B2

(12) United States Patent
Jeon

(10) Patent No.: US 12,595,067 B2
(45) Date of Patent: Apr. 7, 2026

---

(54) WING FOR AIRCRAFT HAVING BATTERY MODULES AND SPARS SUPPORTED BY FLANGE PORTIONS OF RIBS

(71) Applicants: HYUNDAI MOTOR COMPANY, Seoul (KR); Kia Corporation, Seoul (KR)

(72) Inventor: Yoon Cheol Jeon, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/947,663

(22) Filed: Nov. 14, 2024

(65) Prior Publication Data

US 2026/0001651 A1 Jan. 1, 2026

(30) Foreign Application Priority Data

Jun. 26, 2024 (KR) ........................ 10-2024-0083871

(51) Int. Cl.
| | |
|---|---|
| *B64D 27/31* | (2024.01) |
| *B64C 3/18* | (2006.01) |
| *B64C 3/32* | (2006.01) |
| *B64D 27/357* | (2024.01) |
| *H01M 50/209* | (2021.01) |
| (Continued) | |

(52) U.S. Cl.
CPC .............. *B64D 27/31* (2024.01); *B64C 3/185* (2013.01); *B64C 3/187* (2013.01); *B64C 3/32* (2013.01); *B64D 27/357* (2024.01); *H01M 50/209* (2021.01); *H01M 50/249* (2021.01); *H01M 50/258* (2021.01); *H01M 50/262* (2021.01); *H01M 50/291* (2021.01); *H01M 2220/20* (2013.01)

(58) Field of Classification Search
CPC .......... B64C 3/16; B64C 3/185; B64C 3/187; B64C 3/18; B64C 3/32; B64D 27/357
See application file for complete search history.

(56) References Cited

U.S. PATENT DOCUMENTS

| | | |
|---|---|---|
| 4,739,954 A | 4/1988 | Hamilton |
| 9,156,559 B2 | 10/2015 | Grip et al. |
| (Continued) | | |

FOREIGN PATENT DOCUMENTS

| | | |
|---|---|---|
| CN | 106628114 B | 6/2020 |
| JP | 2022-094198 A | 6/2022 |
| (Continued) | | |

OTHER PUBLICATIONS

Mobility Devices, Americans with Disabilities Act (ADA). https://www.ada.gov/topics/mobility-devices/#:~:text=Wheelchairs%20and%20Manually%20Powered%20Devices,-Wheelchairs%20are%20manually&text=devices%20also%20include:-,Walkers,Braces.*

(Continued)

*Primary Examiner* — Arfan Y. Sinaki
(74) *Attorney, Agent, or Firm* — Fish & Richardson P.C.

(57) ABSTRACT

A wing for an aircraft include battery modules a plurality of ribs that are spaced apart from one another in a longitudinal direction of the wing, the plurality of ribs respectively defining a plurality of first through-holes through which the battery modules pass, a plurality of first flange portions that are respectively disposed at the plurality of ribs along edges of the first through-holes, the plurality of first flange portions defining battery seating surfaces that support the battery modules, and a spar that supports the plurality of ribs.

17 Claims, 8 Drawing Sheets

(51) Int. Cl.

| | |
|---|---|
| *H01M 50/249* | (2021.01) |
| *H01M 50/258* | (2021.01) |
| *H01M 50/262* | (2021.01) |
| *H01M 50/291* | (2021.01) |

(56) References Cited

U.S. PATENT DOCUMENTS

| | | | |
|---|---|---|---|
| 11,597,528 B2 * | 3/2023 | Villanueva | B64C 3/32 |
| 12,116,129 B2 | 10/2024 | Yanagimoto | |
| 2005/0196231 A1 * | 9/2005 | McKay | F16B 7/18 |
| | | | 403/364 |
| 2016/0207607 A1 * | 7/2016 | Charles | B64C 1/064 |
| 2020/0140103 A1 | 5/2020 | Halverson | |
| 2022/0204154 A1 | 6/2022 | Roe et al. | |
| 2022/0274684 A1 | 9/2022 | Tulloch | |
| 2022/0402622 A1 | 12/2022 | Villanueva et al. | |
| 2023/0322383 A1 | 10/2023 | Yanagimoto | |
| 2024/0021943 A1 * | 1/2024 | Amante | B60L 50/66 |

| | | | |
|---|---|---|---|
| 2024/0132223 A1 | 4/2024 | Ahn | |
| 2024/0228050 A9 | 7/2024 | Ahn | |
| 2024/0326614 A1 | 10/2024 | Jeon et al. | |
| 2024/0326977 A1 | 10/2024 | Jeon et al. | |

FOREIGN PATENT DOCUMENTS

| | | | | |
|---|---|---|---|---|
| KR | 10-2016-0115864 A | 10/2016 | | |
| KR | 10-1860021 B1 | 5/2018 | | |
| KR | 10-2021-0148487 A | 12/2021 | | |
| KR | 10-2559847 B1 | 7/2023 | | |
| KR | 10-2024-0148146 A | 10/2024 | | |
| KR | 10-2024-0148147 A | 10/2024 | | |
| WO | WO-2024144643 A1 * | 7/2024 | | B64C 3/185 |

OTHER PUBLICATIONS

Extended European Search Report in European Appln. No. 24215446. 6, mailed on Apr. 17, 2025, 9 pages.

* cited by examiner

WING FOR AIRCRAFT HAVING BATTERY MODULES AND SPARS SUPPORTED BY FLANGE PORTIONS OF RIBS

CROSS-REFERENCE TO RELATED APPLICATION

This application claims priority to and the benefit of Korean Patent Application No. 10-2024-0083871, filed in the Korean Intellectual Property Office, on Jun. 26, 2024, the entire contents of which are incorporated herein by reference.

TECHNICAL FIELD

The present disclosure relates to a wing for an aircraft, and more particularly, to a wing for an aircraft, which is capable of contributing to a reduction in weight while ensuring rigidity of the wing.

BACKGROUND

An aircraft may use batteries as a power source. For example, the aircraft may include a plurality of batteries as a power source. In some cases, the batteries may be mounted to a fuselage and a wing of the aircraft. The fuselage of the aircraft may be also used for a cabin, a luggage room, and a space, in which passengers are seated. In some cases, where the battery are mounted in the fuselage, a space for luggage may be reduced.

In some cases, where the batteries are mounted in the wings of the aircraft, the spatial utilization of the fuselage may be ensured. In some cases, loads (e.g., battery loads) to be applied to the wings may be increased, and an effect of vibration loads may be increased. Therefore, an additional structure may be provided to reinforce the rigidity of the wings.

In some cases, where the wing becomes heavy because of the structure for ensuring the rigidity of the wing, it may be difficult to stably control the aircraft, and the safety and reliability may be degraded.

SUMMARY

The present disclosure describes a wing for an aircraft, which is capable of contributing to a reduction in weight while ensuring rigidity of the wing.

In particular, the present disclosure may help minimize an increase in weight of the wing while stably ensuring rigidity of the wing without an additional structure for reinforcing the rigidity of the wing equipped with a battery module.

For example, the present disclosure describes a battery module and a rib that are integrally assembled without using a separate structure.

The present disclosure describes a wing that can help effectively disperse a load applied to the wing and allow the wing to have a natural frequency in a high-frequency band, thereby reducing the weight. The present disclosure describes a wing that can simplify the structure and an assembling process and reduce costs. The present disclosure describes a wing that can improve safety, reliability, a degree of design freedom, and spatial utilization of an aircraft.

According to one aspect of the subject matter described in this application, a wing for an aircraft includes: battery modules, a plurality of ribs that are spaced apart from one another in a longitudinal direction of the wing, the plurality of ribs respectively defining a plurality of first through-holes through which the battery modules pass, a plurality of first flange portions that are respectively disposed at the plurality of ribs and define a plurality of battery seating surfaces configured to support the battery modules, each of the plurality of first flange portions being disposed along an edge of one of the plurality of first through-holes, and a spar that extends through and supports the plurality of ribs. This structure of the wing is to ensure the rigidity of the wing and contribute to the reduction in weight.

Implementations according to this aspect can include one or more of the following features. For example, the first flange portion may be integrated with the rib, and the battery module may be supported by the first flange portion. Therefore, it may be possible to obtain an advantageous effect of minimizing an increase in weight of the wing while stably ensuring the rigidity of the wing without an additional structure for reinforcing the rigidity of the wing equipped with the battery module.

In some implementations, the battery module and the rib may be integrally assembled, and the rib and the spar may be continuously connected by a kind of sub-frame structure. Therefore, it is possible to prevent a load applied to the wing from being concentrated on a particular site. Further, it may be possible to disperse an overall load along the ribs and the spars constituting the sub-frame structure and thus design the reduction in weight.

The first flange portion may have various structures capable of defining the battery seating surface on which the battery module is seated (supported).

In some implementations, each of the plurality of first flange portions includes a first flange disposed at a corresponding one of the plurality of ribs along an upper edge of a corresponding one of the plurality of first through-holes, the first flange supporting an upper surface of one of the battery modules, and a second flange disposed at the corresponding one of the plurality of ribs along a lower edge of the corresponding one of the plurality of first through-holes, the second flange supporting a bottom surface of the one of the battery modules. In some examples, at least one of the first flange or the second flange defines a fastening hole for fastening the one of the battery modules.

In some implementations, the plurality of first flange portions may be in contact with the battery modules. In some examples, each of the plurality of ribs further defines a second through-hole that receives the spar.

In some implementations, the wing may further include a plurality of second flange portions that are respectively disposed at the plurality of ribs, each of the second flange portions being disposed along an edge of the second through-hole and defining a spar seating surface that supports the spar. In some examples, the plurality of second flange portions may be in contact with the spar. In some examples, each of the plurality of second flange portions may have a cross-section corresponding to the spar.

In some implementations, the wing may further include a locking part configured to selectively restrain an arrangement state of one of the plurality of ribs with respect to the spar. In some examples, each of the plurality of second flange portions defines a restraint hole configured to catch the locking part. In some examples, the locking part may include an inner race coupled to the spar, an outer race that surrounds a periphery of the inner race and is configured to be accommodated in one of the plurality of second flange portions, a plunger member provided between the inner race and the outer race and configured to be move between (i) a first position in which the plunger member is restrained by the restraint hole and (ii) a second position in which the plunger member is unrestrained from the restraint hole, and a plunger spring configured to elastically support movement of the plunger member, the plunger spring having (i) a first end supported on the inner race and (ii) a second end supported on the plunger member.

In some implementations, the locking part is one of a plurality of locking parts that are spaced apart from one another in a circumferential direction of the spar. In some examples, each of the battery modules is supported by at least two or more of the plurality of ribs. In some examples, the spar may include a front spar provided adjacent to a front end of the plurality of ribs, and a rear spar provided adjacent to a rear end of the plurality of ribs.

According to another aspect, a wing for an aircraft includes a plurality of ribs that are spaced apart from one another in a longitudinal direction of the wing, and a spar that extends through the plurality of ribs in the longitudinal direction and supports the plurality of ribs, where each of the plurality of ribs defines a first through-hole configured to receive at least a portion of a battery module, and a second through-hole that receives at least a portion of the spar.

Implementations according to this aspect can include one or more of the following features. For example, each of the plurality of ribs may include a first flange portion that is disposed along an edge of the first through-hole and configured to couple to the battery module, and a second flange portion that is disposed along an edge of the second through-hole and configured to couple to the spar.

In some implementations, the first flange portion may include a first flange disposed along an upper edge of the first through-hole and configured to support an upper surface of the battery module, and a second flange disposed along a lower edge of the first through-hole and configured to support a bottom surface of the battery module.

DETAILED DESCRIPTION

Figure 1:
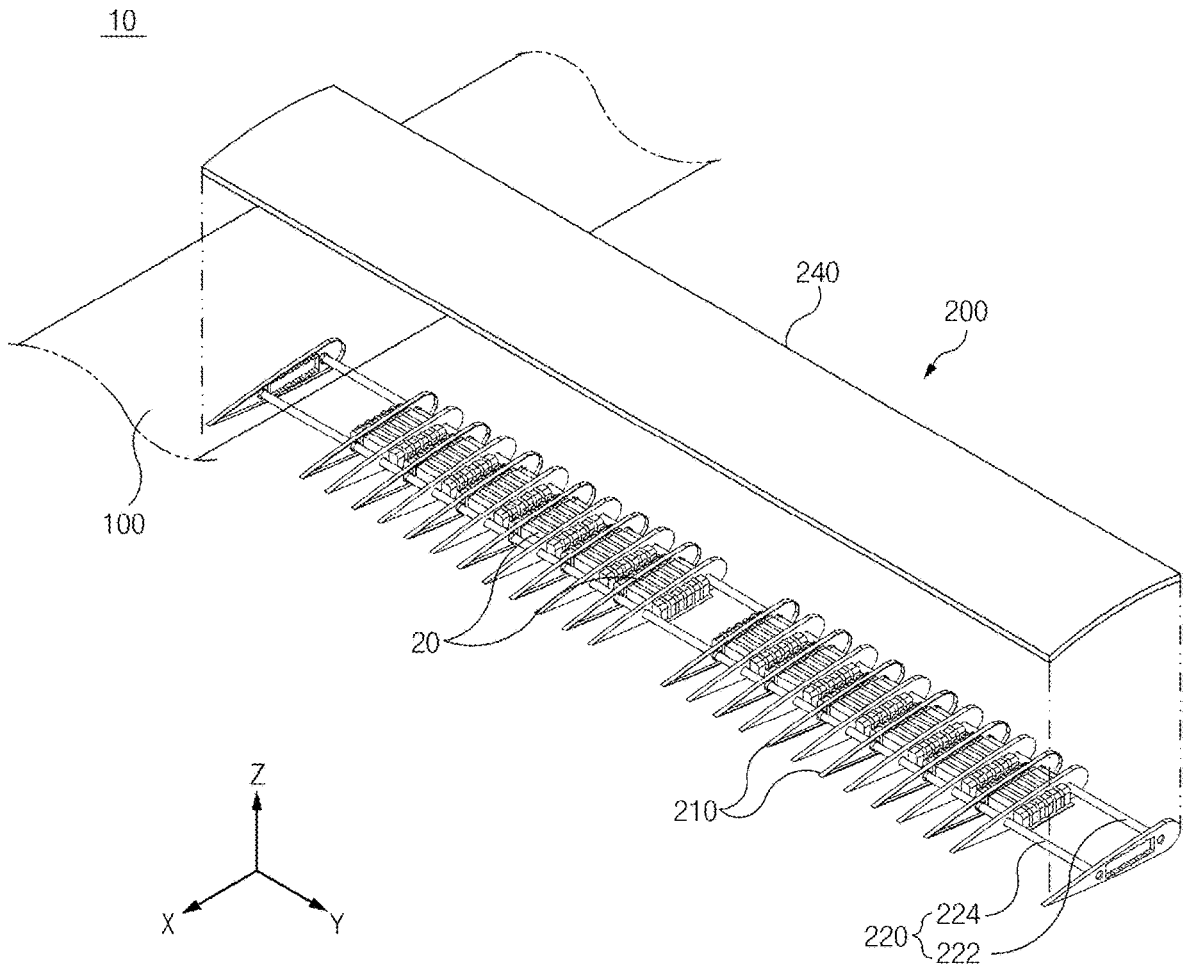
FIG. 1 is a view showing an example of a wing for an aircraft.

Hereinafter, one or more implementations of the present disclosure will be described in detail with reference to the accompanying drawings.

In some implementations, with reference to FIGS. 1 to 8, a wing 200 for an aircraft includes a plurality of ribs 210 that are spaced apart from one another in a longitudinal direction of the wing 200 and have first through-holes 212 through which battery modules 20 may pass, first flange portions 214 that are integrally provided on ribs 210 along edges of the first through-holes 212 and that define battery seating surfaces on which the battery modules 20 are seated, and spars 220 configured to support the plurality of ribs 210 in common.

In some examples, the wing 200 may be applied to various types of aircraft 10. The present disclosure is not restricted or limited by the type and structure of the aircraft 10.

Hereinafter, an example will be described in which the wing 200 is used for an aircraft that uses the battery module 20 as a power source.

With reference to FIG. 1, the battery module 20 is mounted in the wing 200 so as to be used as a power source of the aircraft.

The battery module 20 may be variously changed in type and properties in accordance with various conditions and design specifications. The present disclosure is not restricted or limited by the type and properties of the battery module 20.

For example, the battery module 20 may include a secondary battery including a lithium-ion-polymer battery cell, a lithium-iron phosphate battery cell, or the like. The battery module 20 may have an approximately quadrangular block shape. Alternatively, the battery module 20 may have a cylindrical shape or other shapes.

With reference to FIG. 1, the aircraft 10 includes a fuselage 100, and the wing 200 connected to the fuselage 100.

The fuselage 100 may be equipped with a cabin in which persons may be seated, and a luggage room in which luggage may be loaded. The present disclosure is not restricted or limited by the structure and shape of the fuselage 100.

For example, the fuselage 100 may have a streamlined structure extending in a forward/rearward direction (X-axis direction).

The wings 200 may be provided at left and right sides of the fuselage 100 to generate aerodynamic forces generated by a lift force and a drag force generated during flight.

The wing 200 may be variously changed in structure and shape in accordance with various conditions and design specifications. The present disclosure is not restricted or limited by the structure and shape of the wing 200.

Figure 2:
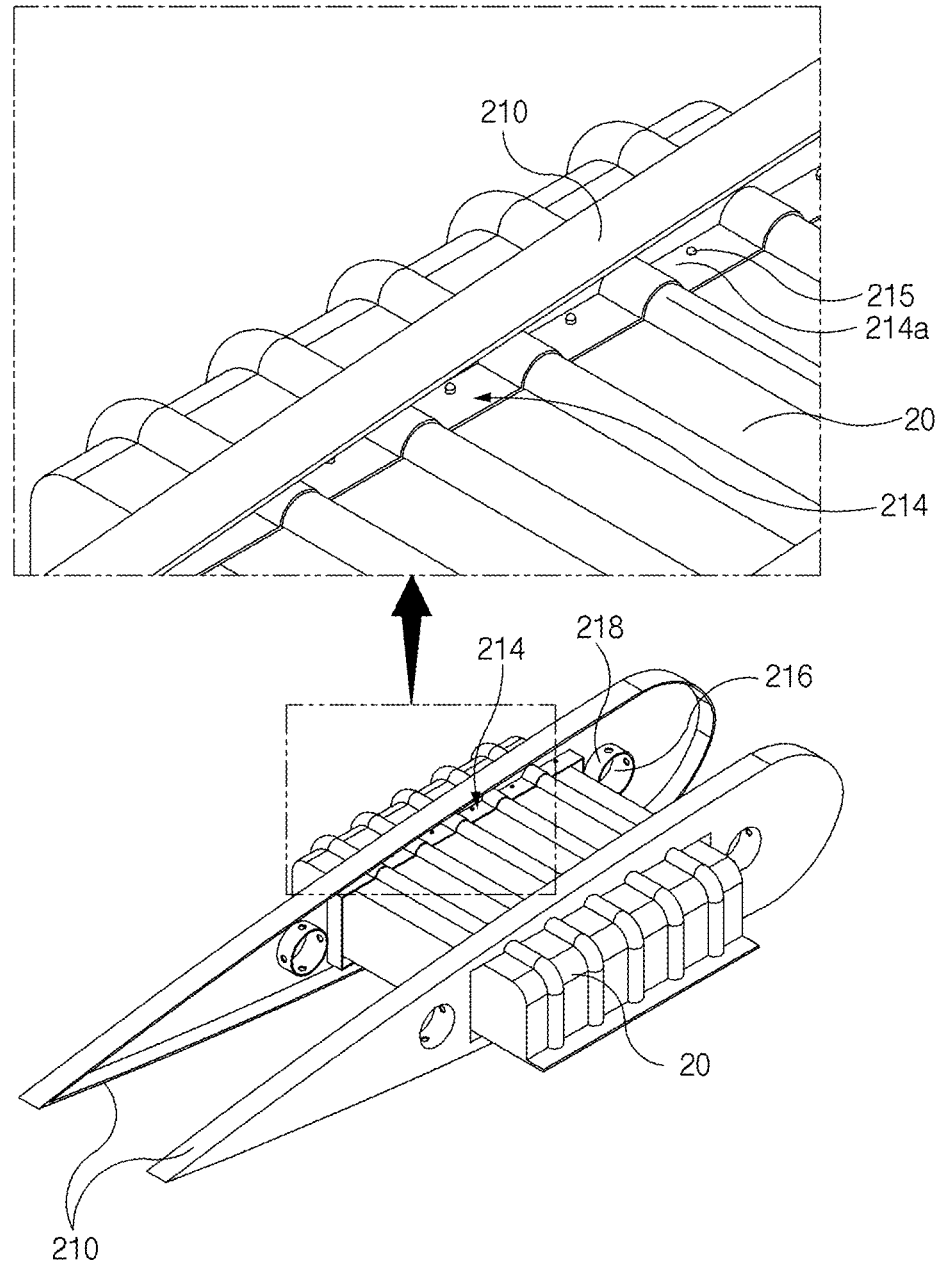
FIGS. 2 and 3 are views showing an example of ribs of the wing.
Figure 3:
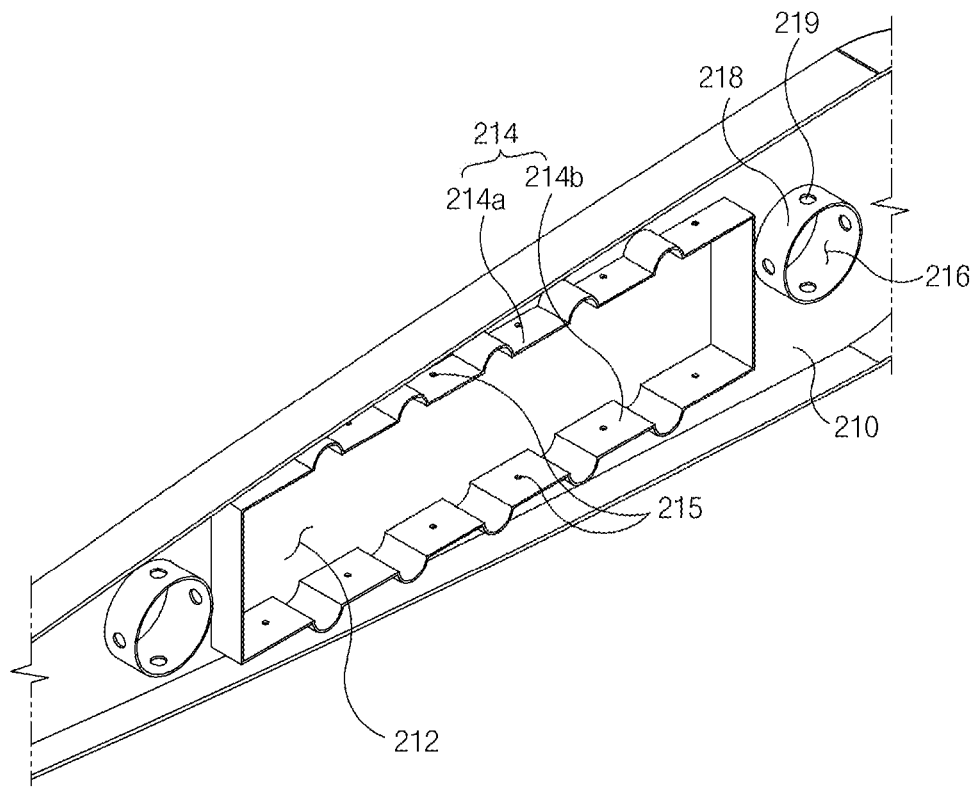

With reference to FIGS. 1 to 3, the rib 210, which is one of the components constituting the wing 200, may define a shape of the wing 200 so that a cross-section of the wing 200 may maintain aerodynamic streamlined shape. The rib 210 is configured to transmit a load of a wing cover (outer sheath) 240 to the spar 220.

The rib 210 may be variously changed in structure and shape in accordance with various conditions and design specifications. The present disclosure is not restricted or limited by the structure and shape of the rib 210. For example, the rib 210 may have an approximately streamlined cross-sectional shape.

The ribs 210 may be provided as a plurality of ribs 210 disposed to be spaced apart from one another at predetermined intervals in the longitudinal direction of the wing 200 (a leftward/rightward direction of the aircraft) (Y-axis direction). The number of ribs 210 and the spacing intervals between the ribs 210 may be variously changed in accordance with various conditions and design specifications.

The first through-hole 212 may be provided in an approximately central portion of the rib 210, and the battery module 20 may pass through the first through-hole 212.

The first through-hole 212 may have various structures through which the battery module 20 may pass. The present disclosure is not restricted or limited by the structure and shape of the first through-hole 212.

For example, the first through-hole 212 may be provided to have a cross-section corresponding to the battery module 20. Hereinafter, an example will be described in which the first through-hole 212 has an approximately quadrangular hole shape. In some implementations, the first through-hole may have an elliptical shape or other shapes.

The first flange portion 214 integrated with the rib 210 along the edge of the first through-hole 212 to define the battery seating surface on which the battery module 20 is seated (supported).

For example, the first flange portion 214 may protrude from one surface of the rib 210 along the edge of the first through-hole 212.

In some implementations, the first flange portion 214 protrudes from one surface of the rib 210. In some implementations, the first flange portions may respectively protrude from two opposite surfaces of the rib.

The first flange portion 214 may have various structures capable of defining the battery seating surface on which the battery module 20 is seated (supported).

In some implementations, the first flange portion 214 may include a first flange 214a integrated with the rib 210 along an upper edge of the first through-hole 212 based on the upward/downward direction (Z-axis direction) and configured such that an upper surface of the battery module 20 is seated on the first flange 214a, and a second flange 214b integrated with the rib 210 along a lower edge of the first through-hole 212 based on the upward/downward direction (Z-axis direction) and configured such that a bottom surface of the battery module 20 is seated on the second flange 214b.

In particular, the first flange portion 214 may be provided to be in surface contact with the battery module 20. That is, the battery seating surface of the first flange 214a may have a structure corresponding to the upper surface of the battery module 20 so as to be in surface contact with the upper surface of the battery module 20. The battery seating surface of the second flange 214b may have a structure corresponding to the bottom surface of the battery module 20 so as to be in surface contact with the bottom surface of the battery module 20. The battery module 20 may be supported between and tightly attached to the first flange 214a and the second flange 214b.

In some implementations, the first flange portion 214 includes both the first flange 214a and the second flange 214b. In some implementations, the first flange portion may include only any one of the first flange and the second flange portion. Alternatively, the first flange portion may be configured to include a lateral flange on which a lateral surface of the battery module is seated.

In some implementations, a fastening hole 215 for fastening the battery module 20 may be provided in at least any one of the first flange 214a and the second flange 214b. The state in which the battery module 20 is seated on the first flange portion 214 may be securely fixed by a fastening member (e.g., a rivet or a fastening bolt) fastened to the fastening hole 215.

In some implementations, the battery module 20 may be supported by at least two or more ribs 210. In some examples, where the battery module 20 is supported by two or more ribs 210, the two or more ribs 210 may collectively support one battery module 20.

For example, among the plurality of ribs 210, a first rib may support one end (e.g., a left end) of the battery module 20. A second rib, which is adjacent to the first rib among the plurality of ribs 210, may support the other end (e.g., a right end) of the battery module 20.

In some implementations, the example is described in which the battery module 20 is supported by the two ribs 210. In some implementations, three or more ribs may collectively support the battery module, or the battery module may be supported by only the single rib.

The spar 220 is configured to cope with a shearing force and bending moment of force applied to the wing 200 and support the plurality of ribs 210 in common.

In this case, the configuration in which the spar 220 supports the plurality of ribs 210 in common is defined as a configuration in which all the plurality of ribs 210 are supported by the single spar 220.

In some implementations, the spars 220 may include a front spar 222 provided adjacent to a front end of the rib 210, and a rear spar 224 provided adjacent to a rear end of the rib 210.

In some implementations, the two spars 220 may be provided in the wing 200. In some implementations, only a single spar may be provided in the wing, or three or more spars may be provided in the wing.

The spar 220 (e.g., the front spar and the rear spar) may have various structures capable of supporting the plurality of ribs 210 in common. The present disclosure is not restricted or limited by the structure and shape of the spar 220.

For example, the spar 220 may have a straight rod shape having a circular cross-section. In some implementations, the spar may have a hollow circular cross-section, a quadrangular cross-section, a hollow quadrangular cross-section, or other cross-sectional shapes.

In some implementations, the wing 200 may include second through-holes 216 provided in the ribs 210 so that the spar 220 may pass through the second through-holes 216.

For example, the second through-holes 216 may be formed at the front and rear ends of the ribs 210 so that the front and rear spars 222 and 224 may pass through the second through-holes 216.

The second through-hole 216 may have various structures through which the spar 220 may pass. The present disclosure is not restricted or limited by the structure and shape of the second through-hole 216.

For example, the second through-hole 216 may be provided to have a cross-section corresponding to the spar 220. Hereinafter, an example will be described in which the second through-hole 216 has an approximately circular hole shape. In some implementations, the second through-hole may have a quadrangular shape, an elliptical shape, or other shapes.

In some implementations, the wing 200 may include a second flange portion 218 integrated with the rib 210 along the edge of the second through-hole 216 and configured to define the spar seating surface on which the spar 220 is seated.

The second flange portion 218 is integrated with the rib 210 along the edge of the second through-hole 216 to define the seating surface on which the spar 220 is seated (supported) in the wing 200.

For example, the second flange portion 218 may protrude from one surface of the rib 210 along the edge of the second through-hole 216.

In some implementations, the second flange portion 218 may have a cross-section corresponding to the spar 220.

In some implementations, the second flange portion 218 protrudes from one surface of the rib 210. In some implementations, the second flange portions may respectively protrude from two opposite surfaces of the rib.

In particular, the second flange portion 218 may be provided to be in surface contact with the spar 220. That is, the spar seating surface of the second flange portion 218 may have a structure corresponding to an outer surface (e.g., an outer peripheral surface) of the spar 220 so as to be in surface contact with the outer surface of the spar 220. The battery module 20 may be supported on and tightly attached to an inner surface of the second flange portion 218.

In some implementations, the second flange portion 218 supports the entire periphery of the spar 220. In some implementations, the second flange portion may be configured to support a part of the periphery of the spar.

Figure 4:
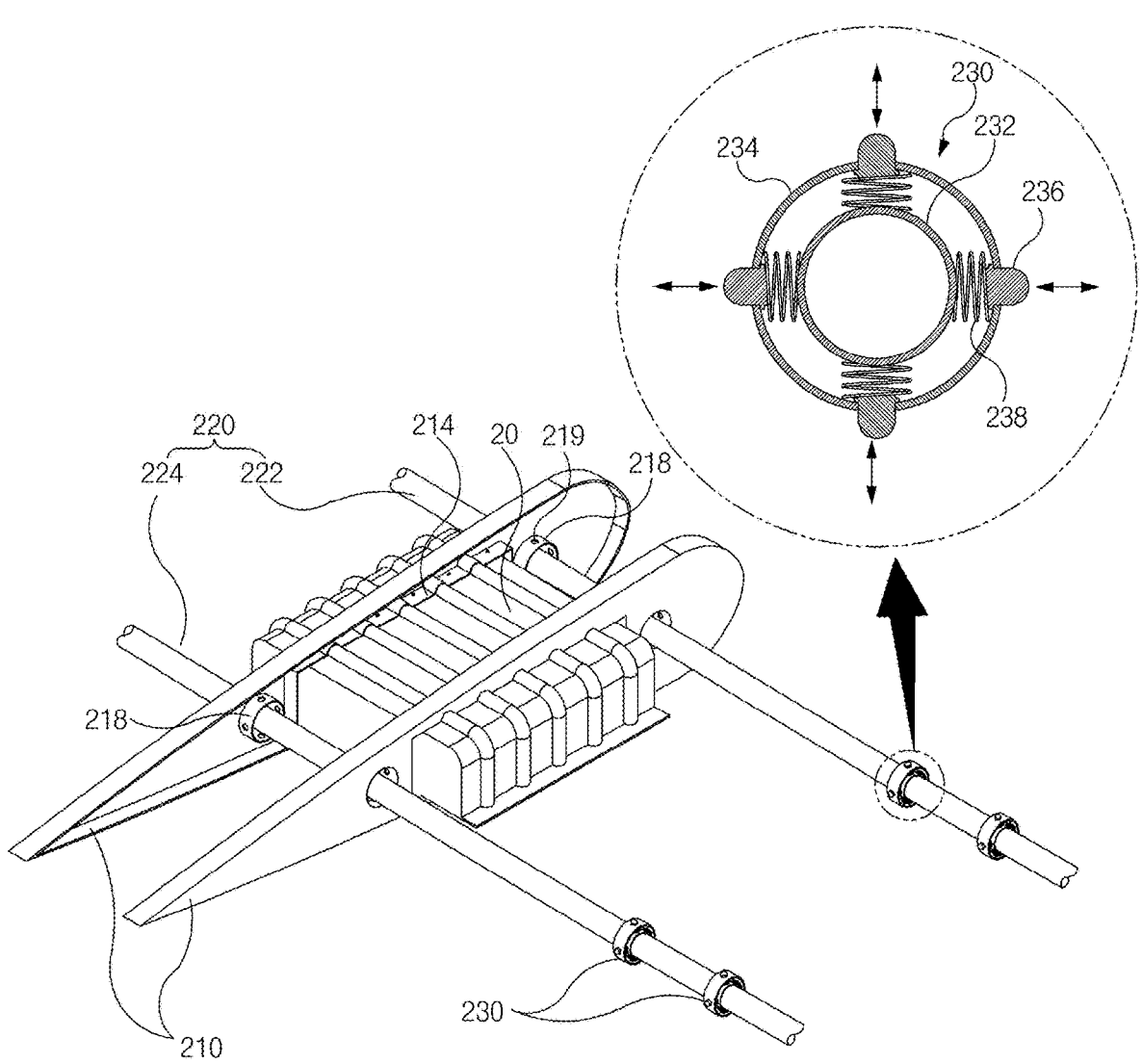
FIGS. 4 and 5 are views showing an example of a locking part of the wing.
Figure 5:
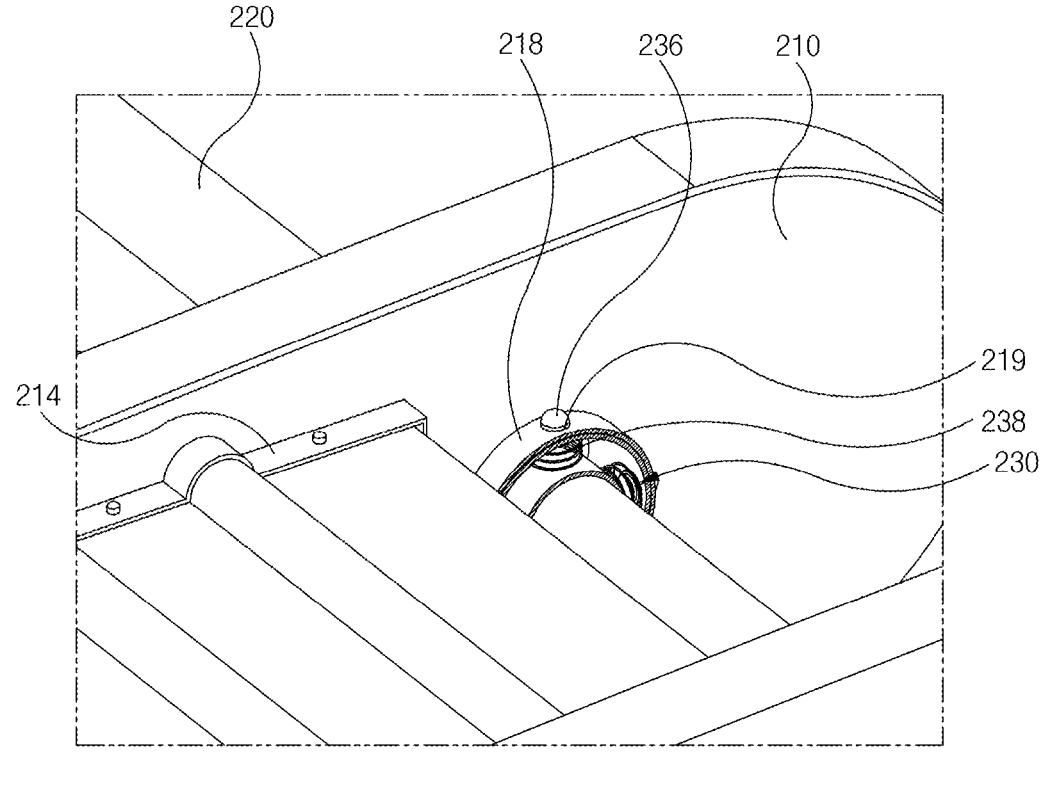

With reference to FIGS. 4 and 5, in some implementations, the wing 200 may include locking parts 230 configured to selectively restrain an arrangement state of the ribs 210 with respect to the spars 220.

The locking part 230 is configured to restrain the state in which the spar 220 is disposed to pass through the second through-hole 216.

In some implementations, the wing 200 may include restraint holes 219 provided in the second flange portion 218, and the locking part 230 may restrain the rib 210 with respect to the spar 220 by the restraint holes 219.

For example, the restraint hole 219 may have a circular cross-sectional shape. In some implementations, the restraint hole may have a quadrangular cross-section or other cross-sectional shape.

The locking part 230 may have various structures capable of selectively restraining the arrangement state of the rib 210 with respect to the spar 220 by the restraint hole 219. The present disclosure is not restricted or limited by the structure of the locking part 230.

In some implementations, the locking part 230 may include an inner race 232 coupled to the spar 220, an outer race 234 provided to surround a periphery of the inner race 232 and accommodated in the second flange portion 218, plunger members 236 provided between the inner race 232 and the outer race 234 and configured to be movable between a first position at which the plunger members 236 are restrained by the restraint holes 219 and a second position at which the plunger members 236 are unrestrained from the restraint holes 219, and plunger springs 238 each having one end supported on the inner race 232, and the other end supported on the plunger member 236, the plunger springs 238 being configured to elastically support movements of the plunger members 236.

For example, the inner race 232 may have a ring shape having an inner diameter corresponding to an outer diameter of the spar 220 and be coupled to the spar 220 (e.g., in an interference-fit manner).

The outer race 234 may have an outer diameter corresponding to an inner diameter of the second flange portion 218, and the outer race 234 may be configured to surround the entire periphery of the inner race 232 and be accommodated in the second flange portion 218.

The plunger member 236 may be provided between the inner race 232 and the outer race 234 and configured to be selectively movable from the first position at which the plunger member 236 is restrained by the restraint hole 219 (a state in which an end of the plunger is accommodated in the restraint hole 219) to the second position at which the plunger member 236 is unrestrained from the restraint hole 219 (in a state in which the end of the plunger is withdrawn from the restraint hole 219).

For example, the plunger member 236 may be configured to be rectilinearly movable in a radial direction of the spar 220 (or the second flange portion). A contact end having an approximately arc cross-sectional shape may be provided at a tip of the plunger member 236 and configured to come into contact with the inner surface of the second flange portion 218 in a sliding manner.

Various spring members capable of elastically supporting the movement of the plunger member 236 (the movement from the first position to the second position) relative to the inner race 232 may be used as the plunger spring 238. The present disclosure is not restricted or limited by the type and structure of the plunger spring 238. For example, a typical coil spring may be used as the plunger spring 238.

In some implementations, the rib 210 and the battery module 20 may be integrally assembled first before the rib 210 and the spar 220 are assembled. The rib 210 integrally assembled to (modularized with) the battery module 20 may be assembled to the spar 220. For example, the battery module 20 may be modularized with the pair of ribs 210.

In some examples, the locking part 230 may be assembled in advance to the spar 220 before the rib 210 (e.g., the rib integrally assembled with the battery module) is assembled to the spar 220.

The plunger members 236 may be maintained at a position protruding to the outside of the outer race 234 by elastic forces of the plunger springs 238 in the state in which the locking part 230 is assembled to the spar 220 (in the state in which the rib is not assembled to the spar).

When the plunger members 236 come into contact with the second flange portion 218 as the spar 220 is inserted into the second through-hole 216 of the rib 210, the plunger members 236 move along the inner surface of the second flange portion 218 in the state in which the plunger members 236 are moved to the second position while compressing the plunger springs 238. Thereafter, when the plunger member 236 moves to the restraint hole 219, the plunger member 236 may elastically protrude to the outside of the outer race 234 and be accommodated in the restraint hole 219, such that the arrangement state of the rib 210 with respect to the spar 220 may be restrained.

The plurality of ribs 210 integrally assembled with the battery modules 20 by the above-mentioned method may be sequentially assembled to the spars 220 in a sliding manner.

As described above, in the present disclosure, when the rib 210 moves to the preset assembling position relative to the spar 220, the plunger member 236 is elastically inserted into the restraint hole 219 without a separate fastening process. Therefore, it is possible to obtain an advantageous effect of simplifying the process of assembling the rib 210 to the spar 220 and improving the assembling accuracy.

In some implementations, the plunger member 236 may be accommodated in the restraint hole 219, and the arrangement state of the rib 210 with respect to the spar 220 may be restrained. In some implementations, the arrangement state of the rib with respect to the spar may be restrained by using a fastening member (e.g., a rivet or a fastening bolt) capable of being fastened to the restraint hole.

In some implementations, the battery module 20 and the rib 210 are integrally assembled, and the rib 210 and the spar 220 are continuously connected by a kind of sub-frame structure. Therefore, it is possible to obtain an advantageous effect of preventing a load applied to the wing 200 from being concentrated on a particular site. Further, it is possible to obtain an advantageous effect of dispersing an overall load along the ribs 210 and the spars 220 constituting the sub-frame structure.

In particular, in the related art in which a separate support bracket is provided between the front spar 222 and the rear spar 224 and two opposite surfaces of the battery module 20 are supported on the support bracket, the battery module 20 is structured to be separated from the rib 210 based on the front spar 222 and the rear spar 224, which causes a problem in that a load applied to the wing 200 (a load of the battery module) is concentrated on a particular site, and it may be difficult to design the reduction in weight.

In some implementations, the battery module 20 and the rib 210 are integrated, and flows of loads are continuously connected (dispersed), such that a load applied to the wing 200 may be effectively dispersed to the constituent components (e.g., the ribs and the spars) of the wing 200. Therefore, it is possible to design the reduction in weight.

In some implementations, two opposite ends of the upper surface of the battery module 20 and two opposite ends of the bottom surface of the battery module 20 are supported on the rib 210 in a four-point supporting manner (the upper and bottom surfaces of the battery module 20 are supported by the two ribs 210). Therefore, it is possible to obtain an advantageous effect of more effectively dispersing vibration generated from the battery module 20 to the surrounding components (e.g., the ribs and the spars).

Figure 6:
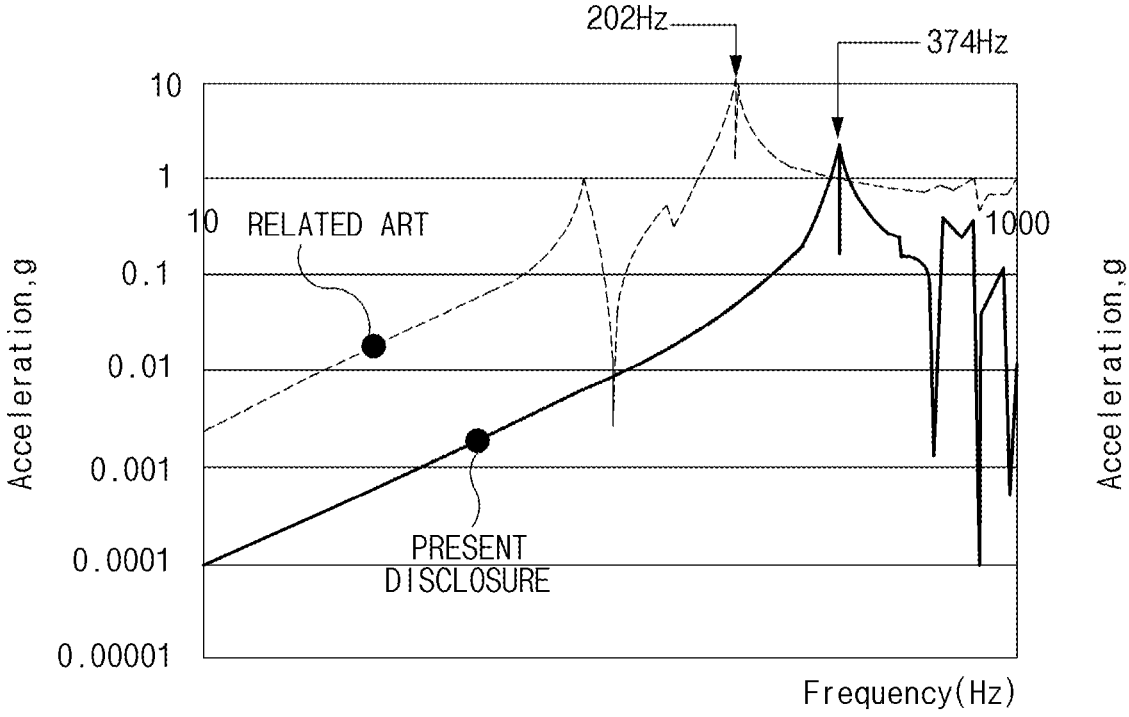
FIGS. 6 to 8 are views showing example experimental results of detecting and analyzing resonance points on the wing with respect to X, Y, and Z-axis directions.
Figure 7:
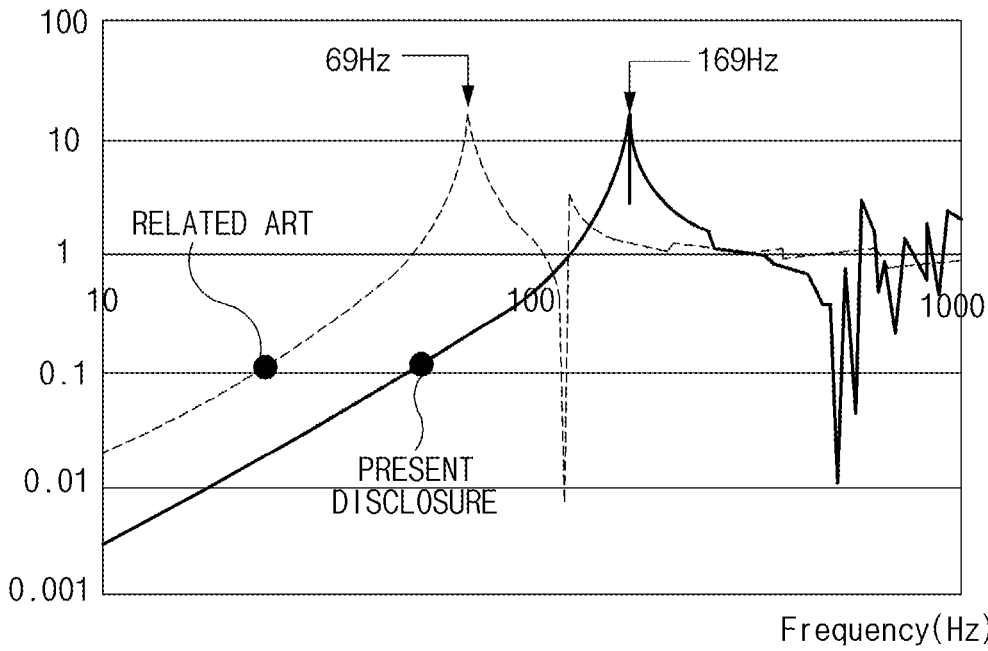
Figure 8:
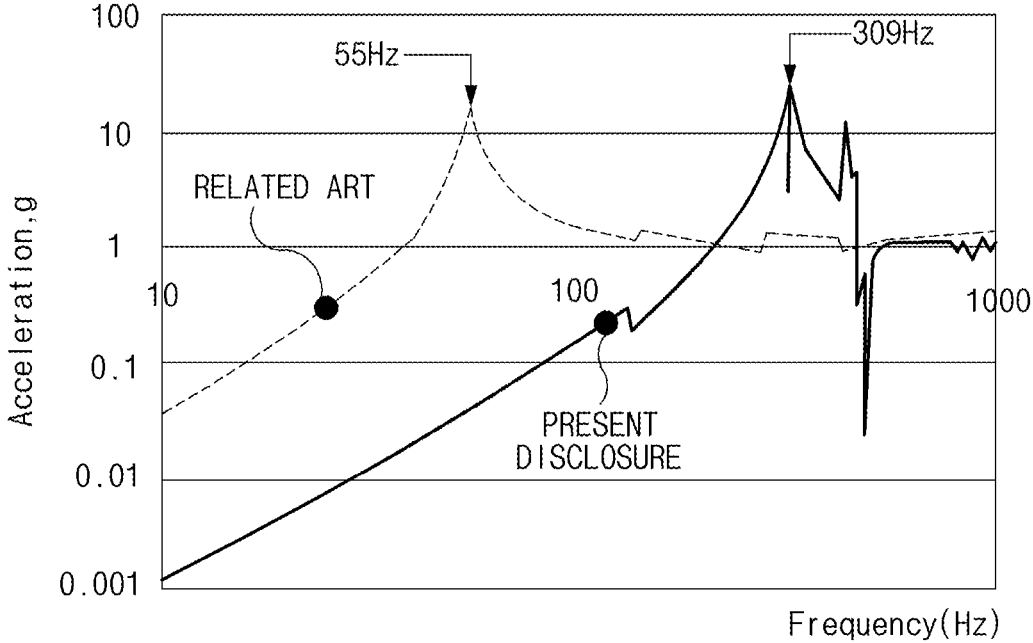

With reference to FIGS. 6 to 8, in some implementations, the battery module 20 may be seated directly on (assembled directly with) the rib 210, and the battery module 20 and the rib 210 may be integrally assembled, such that the load of the battery module 20 may be more effectively dispersed, and a natural frequency with a high-frequency band may be obtained.

In some examples, FIG. 6 is a view for explaining a result of detecting and analyzing a resonance point on the wing 200 for the aircraft 10 in the X-axis direction, FIG. 7 is a view for explaining a result of detecting and analyzing a resonance point on the wing 200 for the aircraft 10 in the Y-axis direction, and FIG. 8 is a view for explaining a result of detecting and analyzing a resonance point on the wing 200 for the aircraft 10 in the Z-axis direction.

With reference to FIG. 6, in the related art in which a separate support bracket is provided between the front spar 222 and the rear spar 224 and two opposite surfaces of the battery module 20 are supported on the support bracket, the resonance point in the X-axis direction of the wing 200 is 202 Hz. In some examples, the resonance point in the X-axis direction of the wing 200 may be 374 Hz, and thus, the present disclosure has a natural frequency in a high-frequency band in comparison with the related art.

With reference to FIG. 7, in the related art in which a separate support bracket is provided between the front spar 222 and the rear spar 224 and two opposite surfaces of the battery module 20 are supported on the support bracket, the resonance point in the Y-axis direction of the wing 200 is 69 Hz. In some examples, the resonance point in the Y-axis direction of the wing 200 may be 169 Hz, and thus, the present disclosure has a natural frequency in a high-frequency band in comparison with the related art.

With reference to FIG. 8, in the related art in which a separate support bracket is provided between the front spar 222 and the rear spar 224 and two opposite surfaces of the battery module 20 are supported on the support bracket, the resonance point in the Z-axis direction of the wing 200 is 55 Hz. In some implementations, the resonance point in the Z-axis direction of the wing 200 may be 309 Hz, and thus, the present disclosure has a natural frequency in a high-frequency band in comparison with the related art.

In some implementations, it may be possible to obtain an advantageous effect of contributing to the reduction in weight while ensuring the rigidity of the wing.

In some implementations, it may be possible to obtain an advantageous effect of minimizing an increase in weight of the wing while stably ensuring the rigidity of the wing without an additional structure for reinforcing the rigidity of the wing equipped with the battery module.

In some implementations, it may be possible to integrally assemble the battery module and the rib without using a separate structure.

In some implementations, it may be possible to obtain an advantageous effect of effectively dispersing a load applied to the wing and allowing the wing to have a natural frequency in a high-frequency band, thereby reducing the weight.

In some implementations, it may be possible to obtain an advantageous effect of simplifying the structure and the assembling process and reducing the costs.

In some implementations, it may be possible to obtain an advantageous effect of improving the safety, the reliability, the degree of design freedom, and the spatial utilization.

While the implementations have been described above, the implementations are just illustrative and not intended to limit the present disclosure. It can be appreciated by those skilled in the art that various modifications and applications, which are not described above, may be made to the present implementation without departing from the intrinsic features of the present implementation. For example, the respective constituent elements specifically described in the implementations may be modified and then carried out. Further, it should be interpreted that the differences related to the modifications and applications are included in the scope of the present disclosure defined by the appended claims.

What is claimed is:

1. A wing for an aircraft, comprising:
   battery modules;
   a plurality of ribs that are spaced apart from one another in a longitudinal direction of the wing, the plurality of ribs respectively defining a plurality of first through-holes through which the battery modules pass;
   a plurality of first flange portions that are respectively disposed at the plurality of ribs and define a plurality of battery seating surfaces configured to support the battery modules, each of the plurality of first flange portions being disposed along an edge of one of the plurality of first through-holes; and
   a spar that extends through and supports the plurality of ribs,
   wherein each of the plurality of first flange portions protrudes from one surface of one of the plurality of ribs along the edge of the one of the plurality of first through-holes.

2. The wing of claim 1, wherein each of the plurality of first flange portions comprises:
   a first flange disposed at a corresponding one of the plurality of ribs along an upper edge of the one of the plurality of first through-holes, the first flange supporting an upper surface of one of the battery modules; and
   a second flange disposed at the corresponding one of the plurality of ribs along a lower edge of the one of the plurality of first through-holes, the second flange supporting a bottom surface of the one of the battery modules.

3. The wing of claim 2, wherein at least one of the first flange or the second flange defines a fastening hole for fastening the one of the battery modules.

4. The wing of claim 1, wherein the plurality of first flange portions are in contact with the battery modules.

5. The wing of claim 1, wherein each of the plurality of ribs further defines a second through-hole that receives the spar.

6. The wing of claim 5, further comprising:
   a plurality of second flange portions that are respectively disposed at the plurality of ribs, each of the second flange portions being disposed along an edge of the second through-hole and defining a spar seating surface that supports the spar.

7. The wing of claim 6, wherein the plurality of second flange portions are in contact with the spar.

8. The wing of claim 6, wherein each of the plurality of second flange portions has a cross-section corresponding to the spar.

9. The wing of claim 6, further comprising:

a locking part configured to restrain an arrangement state of one of the plurality of ribs with respect to the spar.

10. The wing of claim 9, wherein each of the plurality of second flange portions defines a restraint hole configured to catch the locking part.

11. The wing of claim 10, wherein the locking part is one of a plurality of locking parts that are spaced apart from one another in a longitudinal direction of the spar.

12. The wing of claim 1, wherein each of the battery modules is supported by at least two or more of the plurality of ribs.

13. The wing of claim 1, wherein the spar comprises:

a front spar provided adjacent to a front end of the plurality of ribs; and a rear spar provided adjacent to a rear end of the plurality of ribs.

14. The wing of claim 1, wherein the spar extends through the one surface of each rib of the plurality of ribs in the longitudinal direction of the wing.

15. The wing of claim 1, wherein an end of each of the plurality of first flange portions defines the edge of the one of the plurality of first through-holes.

16. The wing of claim 1, wherein a length of each of the plurality of first flange portions in the longitudinal direction is an extension length of the one of the plurality of first through-holes in the longitudinal direction.

17. A wing for an aircraft, comprising:

battery modules;

a plurality of ribs that are spaced apart from one another in a longitudinal direction of the wing, the plurality of ribs respectively defining a plurality of first through-holes through which the battery modules pass;

a plurality of first flange portions that are respectively disposed at the plurality of ribs and define a plurality of battery seating surfaces configured to support the battery modules, each of the plurality of first flange portions being disposed along an edge of one of the plurality of first through-holes; and a spar that extends through and supports the plurality of ribs, wherein each of the plurality of ribs further defines a second through-hole that receives the spar, wherein the wing further comprises:

a plurality of second flange portions that are respectively disposed at the plurality of ribs, each of the second flange portions being disposed along an edge of the second through-hole and defining a spar seating surface that supports the spar, and a locking part configured to restrain an arrangement state of one of the plurality of ribs with respect to the spar, wherein each of the plurality of second flange portions defines a restraint hole configured to catch the locking part, and wherein the locking part comprises:

an inner race coupled to the spar, an outer race that surrounds a periphery of the inner race and is configured to be accommodated in one of the plurality of second flange portions, a plunger member provided between the inner race and the outer race and configured to be move between (i) a first position in which the plunger member is restrained by the restraint hole and (ii) a second position in which the plunger member is unrestrained from the restraint hole, and a plunger spring configured to elastically support movement of the plunger member, the plunger spring having (i) a first end supported on the inner race and (ii) a second end supported on the plunger member.

* * * * *